US009251406B2

(12) United States Patent
Lempel et al.

(10) Patent No.: US 9,251,406 B2
(45) Date of Patent: Feb. 2, 2016

(54) METHOD AND SYSTEM FOR DETECTING USERS' EMOTIONS WHEN EXPERIENCING A MEDIA PROGRAM

(75) Inventors: Ronny Lempel, Zichron Yaakov (IL); Edward Bortnikov, Haifa (IL); Nadav Golbandi, Pardes Hanna Karkur (IL); Sergiy Bilobrov, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 602 days.

(21) Appl. No.: 13/528,427

(22) Filed: Jun. 20, 2012

(65) Prior Publication Data
US 2013/0345840 A1    Dec. 26, 2013

(51) Int. Cl.
| | |
|---|---|
| *G06F 17/00* | (2006.01) |
| *G06K 9/00* | (2006.01) |
| *G06F 17/30* | (2006.01) |
| *G06Q 30/02* | (2012.01) |
| *H04H 60/33* | (2008.01) |
| *H04N 21/422* | (2011.01) |
| *H04N 21/442* | (2011.01) |
| *H04N 21/658* | (2011.01) |
| *H04H 60/58* | (2008.01) |
| *H04H 60/66* | (2008.01) |
| *H04N 21/845* | (2011.01) |

(52) U.S. Cl.
CPC ...... *G06K 9/00315* (2013.01); *G06F 17/30743* (2013.01); *G06K 9/00335* (2013.01); *G06K 9/00711* (2013.01); *G06Q 30/0255* (2013.01); *H04H 60/33* (2013.01); *H04N 21/42203* (2013.01); *H04N 21/44218* (2013.01); *H04N 21/6582* (2013.01); *H04H 60/58* (2013.01); *H04H 60/66* (2013.01); *H04H 2201/90* (2013.01); *H04N 21/8456* (2013.01)

(58) Field of Classification Search
CPC .................. G06F 17/30743; G06F 17/30026; G06F 17/3074; G06Q 30/02; G06Q 50/01; G06Q 30/0241; G06Q 30/0251; H04H 60/37; H04H 60/65; H04H 21/4394; H04H 21/42203
See application file for complete search history.

(56) References Cited

U.S. PATENT DOCUMENTS

| | | | |
|---|---|---|---|
| 6,585,521 B1* | 7/2003 | Obrador | 434/236 |
| 2007/0124756 A1* | 5/2007 | Covell et al. | 725/18 |

* cited by examiner

*Primary Examiner* — Curtis Kuntz
*Assistant Examiner* — Thomas Maung
(74) *Attorney, Agent, or Firm* — James J. DeCarlo; Greenberg Traurig, LLP

(57) ABSTRACT

A system and method for aggregating emotions of users for a media program. A server stores reference audio signal fingerprints, each associated with a reference audio signal of the program. For each user, the server computer: receives a first audio signal fingerprint from a client device operated by a user, the first audio signal fingerprint associated with a first audio signal comprising ambient sound associated with the user and an audio signal of the program; searches the stored reference audio signal fingerprints to determine one that is related to the first audio signal fingerprint; determines an ambient sound signal by obtaining a difference between the stored reference audio signal fingerprint and the first audio signal fingerprint; and determines, using the ambient sound signal, an emotion of the user for a program segment. The server computer aggregates the emotions to determine a representative emotion of the users for the segment.

27 Claims, 10 Drawing Sheets

METHOD AND SYSTEM FOR DETECTING USERS' EMOTIONS WHEN EXPERIENCING A MEDIA PROGRAM

FIELD

The present disclosure relates to media programs, and more specifically to aggregating users' emotions when the users experience a media program.

BACKGROUND

The determination of ratings for a television show is typically important to a broadcasting company. Ratings help determine the show's time slot, whether the show should be aired, how much to charge for commercials during the show, etc. Ratings are usually determined through surveys or polls. This often requires making some assumptions, such as an extrapolation of the number of people who watch the show relative to the polled or surveyed group. This can be inaccurate.

Television show editors typically have to watch a television show and determine which portions of the show should be put into a commercial and/or highlight reel. An editor may also review and mine posts made by users on one or more social networking sites (e.g., tweets on Twitter®, posts on Facebook®, etc.) to determine which parts of the show generated interest of its fans. These techniques take time and effort by the editor. Further, posts are often in slang or jargon and may not be helpful in determining what is liked or disliked about a show. Additionally, posts on a social networking site often do not occur at the moment of a segment of a show that is liked or disliked.

SUMMARY

The present disclosure relates to determining emotions of one or more users experiencing a media program. When users watch TV, they often use mobile devices to find additional information related to the broadcasted content. A mobile application allows the automatic displaying of related content on a mobile device (referred to as a "second screen experience").

In one aspect, a system and method for aggregating emotions of users for a media program is disclosed. A server stores reference audio signal fingerprints, each associated with a reference audio signal of the media program. For each user, the server computer: receives a first audio signal fingerprint from a client device operated by a user, the first audio signal fingerprint associated with a first audio signal comprising ambient sound associated with the user and an audio signal of the media program; searches the stored reference audio signal fingerprints to determine one that is related to the first audio signal fingerprint; determines an ambient sound signal comprising the ambient sound by obtaining a difference between the stored reference audio signal fingerprint and the first audio signal fingerprint; and determines, using the ambient sound signal, an emotion of the user for a segment of the media program. The server computer aggregates the user emotions to determine a representative emotion of the plurality of users for the segment of the media program.

In one embodiment, the determining of the emotion of the user further includes determining an amplitude of the ambient sound signal. In one embodiment, the determining of the emotion of the user further includes performing a spectrum analysis of the ambient sound signal to classify the ambient sound signal. In one embodiment, the determining of the emotion of the user further includes comparing the ambient sound signal with a plurality of other ambient sound signals.

In one embodiment, the determining, from the ambient sound signal, of an emotion of the user further includes determining, from the ambient sound signal, an emotion of laughing, crying, cheering, screaming, clapping, booing, stomping, singing, and/or a sound made by an instrument.

The receiving of the first audio signal fingerprint including ambient sound associated with the user can include receiving the first audio signal fingerprint including ambient sound associated with the user and with other people in an area associated with the user (e.g., in the same room). In one embodiment, the searching of the stored plurality of reference audio signal fingerprints to determine one of the stored plurality of reference audio signal fingerprints that is related to the first audio signal fingerprint further includes searching the stored plurality of reference audio signal fingerprints to determine one of the stored plurality of reference audio signal fingerprints that matches the first audio signal fingerprint above a given threshold.

In one embodiment, the determining emotion of the user is transmitted to the client device. An advertisement can also be transmitted to the client device, such as an advertisement relating to the user's emotion, the media program, the team in the sports program/contest that the user provided his emotion for, etc. In one embodiment, a status on a social networking site is updated based on the emotion, such as by making a user's profile on a social networking site reflect the emotion (e.g., making the user's profile exhibit a laughing emotion when the user laughs). This user profile can be sent to, for example, the user's connections or friends on the social networking site (e.g., while watching the media program).

In one embodiment, the aggregating of the emotion of each user to determine a representative emotion of the plurality of users includes identifying that the segment of the media program should be a highlight of the media program. In one embodiment, the aggregating includes transmitting a recommendation that the media segment should be a highlight to a third party. In one embodiment, the aggregating includes identifying a team that the user is cheering for in the media program. In one embodiment, the aggregating includes providing show synopsis of the media program based on the representative emotion of the users.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
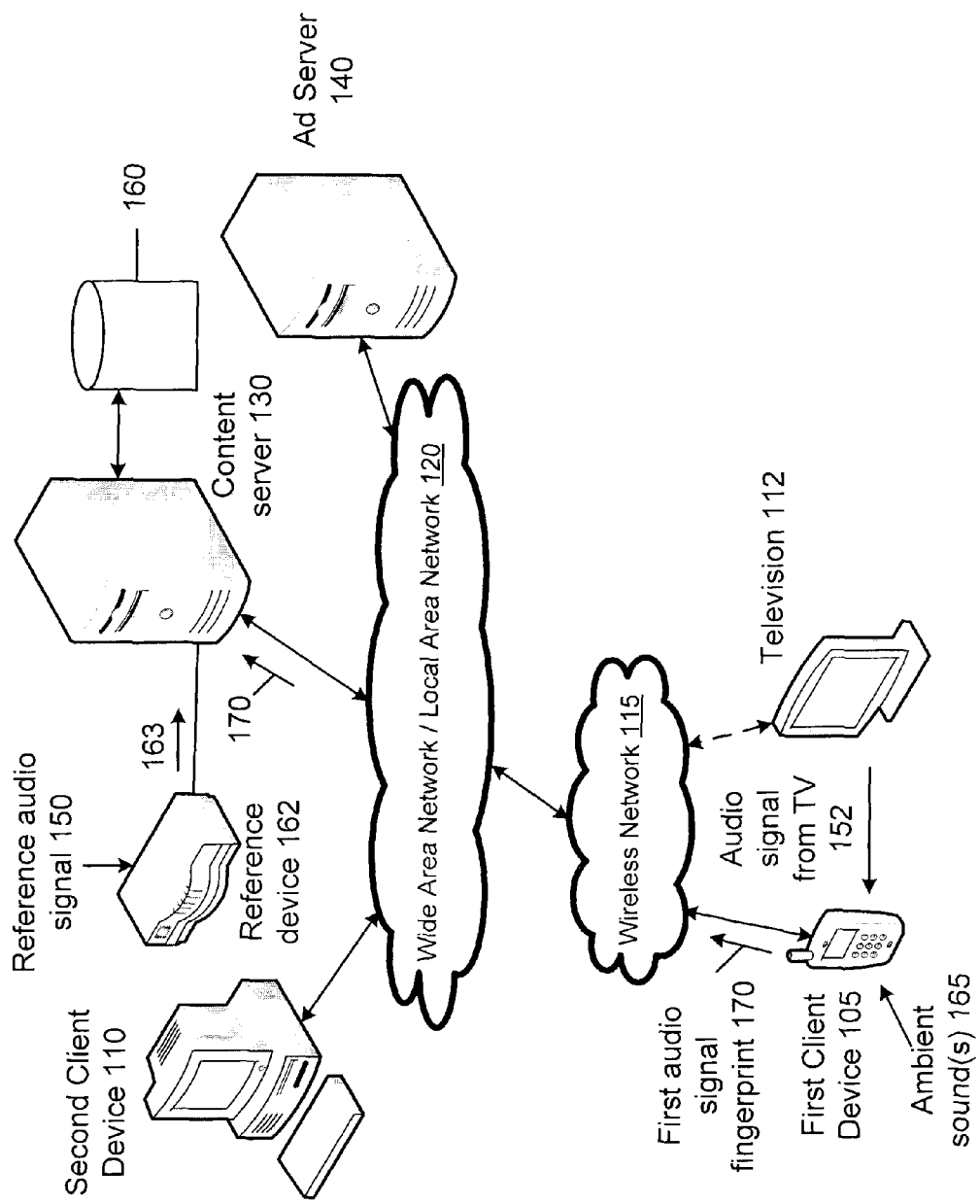
FIG. 1 is a block diagram of client devices communicating over a network with server computers in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 is a schematic diagram illustrating an example embodiment of a network and devices implementing embodiments of the present disclosure. Other embodiments that may vary, for example, in terms of arrangement or in terms of type of components, are also intended to be included within claimed subject matter. FIG. 1 includes, for example, a first client device 105 in communication with a content server 130 over a wireless network 115 connected to a local area network (LAN)/wide area network (WAN) 120, such as the Internet. Content server 130 is also referred to below as server computer 130 or server 130. In one embodiment, the first client device 105 is also in communication with an ad server 140. Although shown as a wireless network 115 and WAN/LAN 120, the client device 105 can communicate with servers 130, 140 via any type of network. In one embodiment, a second client device 110 is also in communication with servers 130, 140 (e.g., via the LAN/WAN 120).

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content server 130 may include a device that includes a configuration to provide content via a network to another device. A content server 130 may, for example, host a site, such as a social networking site, examples of which may include, without limitation, Flickr®, Twitter®, Facebook®, LinkedIn®, or a personal user site (such as a blog, vlog, online dating site, etc.). A content server 130 may also host a variety of other sites, including, but not limited to business sites, educational sites, dictionary sites, encyclopedia sites, wikis, financial sites, government sites, etc.

Content server 130 may further provide a variety of services that include, but are not limited to, web services, third-party services, audio services, video services, email services, instant messaging (IM) services, SMS services, MMS services, FTP services, voice over IP (VoIP) services, calendaring services, photo services, or the like. Examples of content may include text, images, audio, video, or the like, which may be processed in the form of physical signals, such as electrical signals, for example, or may be stored in memory, as physical states, for example.

In one embodiment, the content server 130 hosts or is in communication with a fingerprint database 160. Examples of devices that may operate as a content server include desktop computers, multiprocessor systems, microprocessor-type or programmable consumer electronics, etc.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

In one embodiment and as described herein, the first client device 105 is a smartphone and the second client device 110 is a computer. In another embodiment, the first client device 105 is a tablet. The first client device 105 is, in one embodiment, in the same room as a television 112 (or other media player). Further, in another embodiment, the first client device 105 is included in the television 112 itself (e.g., a smart TV), is a computer, a computer monitor, a radio, an iPod®, etc.

Suppose a user of the first client device 105 turns on the television 112 and begins experiencing (e.g., watching, listening to) a media program played on the television 112. Although described as a media program being played on the television, in another embodiment the media program is played on a movie screen, is a concert performed on a stage, or any other program that produces audio. In one embodiment, first client device 105 records (e.g., continuously or a portion of, such as the first minute of) the audio of the media program played on the television 112.

In one embodiment, a reference audio signal 150 associated with the program played on TV 112 is generated by a reference device 162 (e.g., cable box). In one embodiment, this signal 150 from the cable box 162 is processed by a fingerprinter (the fingerprinter may be a separate device or it may be embedded in the device 162) and is sent to the server (e.g., via a direct connection between the device 162 and the server 130). In one embodiment, the reference device 162 is part of the backend (the server 130 and the reference device 162 may be located in the same data center). This reference device 162 is, in one embodiment, operated by a network administrator, not by a user. The reference device 162 can have a microphone to record the reference signal 150, but in one embodiment the device 162 records a clean signal directly from the audio source (e.g., wired connection) and generates a clean reference signal without noise (it may alternatively use a microphone to record a reference audio signal 150 of a live show, such as a concert, performance, etc.)

The client device 105 records audio via a microphone (e.g., audio signal 152 and ambient sounds 165). The client device produces a first audio signal fingerprint 170, which is distorted.

In one embodiment and as described in more detail below, the reference device 162 then generates a reference audio signal fingerprint 163 associated with the reference audio signal 150. The reference device 162 transmits this reference audio signal fingerprint 163 to the server computer 130. The server computer 130 stores this reference audio signal fingerprint 163, such as in database 160. In one embodiment, the database 160 stores a plurality of reference audio signal fingerprints for many media programs (e.g., received continuously from one or a plurality of reference devices). In another embodiment, the server computer 130 obtains the reference audio signal 150 from the signal being broadcast to the television 112.

In one embodiment, the first client device 105 records a first audio signal (e.g., continuously, periodically, for a given period of time, etc.). The first audio signal includes the audio signal from the TV 152 and ambient sounds 165 associated with the user, such as sounds 165 that the user (or other people in the room) make while the media program is playing. In one embodiment, the first client device 105 records the audio signal 152 and ambient sounds 165 via a microphone on the first client device 105. The ambient sounds 165 can include, for example, laughter (e.g., during a comedy program), cheers (e.g., during a sports game), clapping, boos, screams, crying, stomping, singing, sound made by an instrument (e.g., vuvuzela), or any other sound made by one or more users watching the media program in an area associated with the user, such as in the same room.

In one embodiment, the first client device 105 then generates one or more first audio signal fingerprints, which could be processed or generated in real- or near-real time continuously or in chunks or portions and then transmits the first audio signal fingerprint 170 to the server computer 130. In one embodiment, the first client device 105 records the first audio signal and stores all fingerprints off-line and then sends the fingerprints 170 to the server computer 130 when an Internet connection is available.

When the server computer 130 receives the first audio signal fingerprint 170, the server computer 130 searches database 160 for reference audio signal fingerprints that approximately match the first audio signal fingerprint 170. In one embodiment, the server computer 130 determines a match when a percentage of each fingerprint matches above a given threshold. For example, the server computer 130 determines that the first audio signal fingerprint 170 matches a reference audio signal fingerprint when 50% or 75% of the first audio signal fingerprint 170 matches the reference audio signal fingerprint.

In one embodiment, the server computer 130 then calculates the difference between the first audio signal fingerprint 170 and the matching reference audio signal fingerprint. The server computer 130 determines that the difference between the fingerprints represents the ambient sounds associated with the user. In one embodiment, the server computer 130 transmits a representation of the ambient sounds to the first client device 105, such as by updating a user's profile on a web page (e.g., Yahoo!) to represent the ambient sounds. For example, the server computer 130 can determine that the ambient sounds represent laughter and may make a user's face on a user's profile laugh due to the ambient sounds. If a match is found and emotion characteristics are extracted from the fingerprint, in one embodiment the server 130 may send this information to other sites and client devices to update the client status.

In one embodiment, the first client device 105 has downloaded a mobile application (e.g., via an "app store") to perform the above functions (e.g., recording the audio signal 152 and/or the ambient sounds 165).

In one embodiment, emotions from many users who are consuming the same media experience (e.g., TV program) are aggregated. This aggregation of user emotions enables inference with high confidence whether the emotions of individuals are related to the media experience or not, and what they mean. As described in more detail below, this aggregation of emotions enables applications of providing program synopses and highlights, giving broadcasters feedback on well performing moments, and monetizing directly with users.

In one embodiment, the server computer 130 and/or ad server 140 communicate one or more advertisements as part of the transmission from the server computer 130 to the first client device 105. The advertisement(s) may be, for example, for one or more products or services, for a media program, for a video game, for an app, etc. In one embodiment, the advertisements are associated with the ambient sounds, such as advertisements for products associated with a sports team (e.g., tickets, shirts, hats, etc.) that the user cheered for during a sports game played on the television 112 (based on the aggregation of user emotions). Thus, the advertisements are targeted ads relating to the subject of the media program that evoked a response from users.

A process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers.

For web portals like Yahoo!, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Ad server 140 comprises a server that stores online advertisements for presentation to users. "Ad serving" refers to methods used to place online advertisements on websites, in applications, or other places where users are more likely to see them, such as during an online session or during computing platform use, for example.

During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Figure 2A:
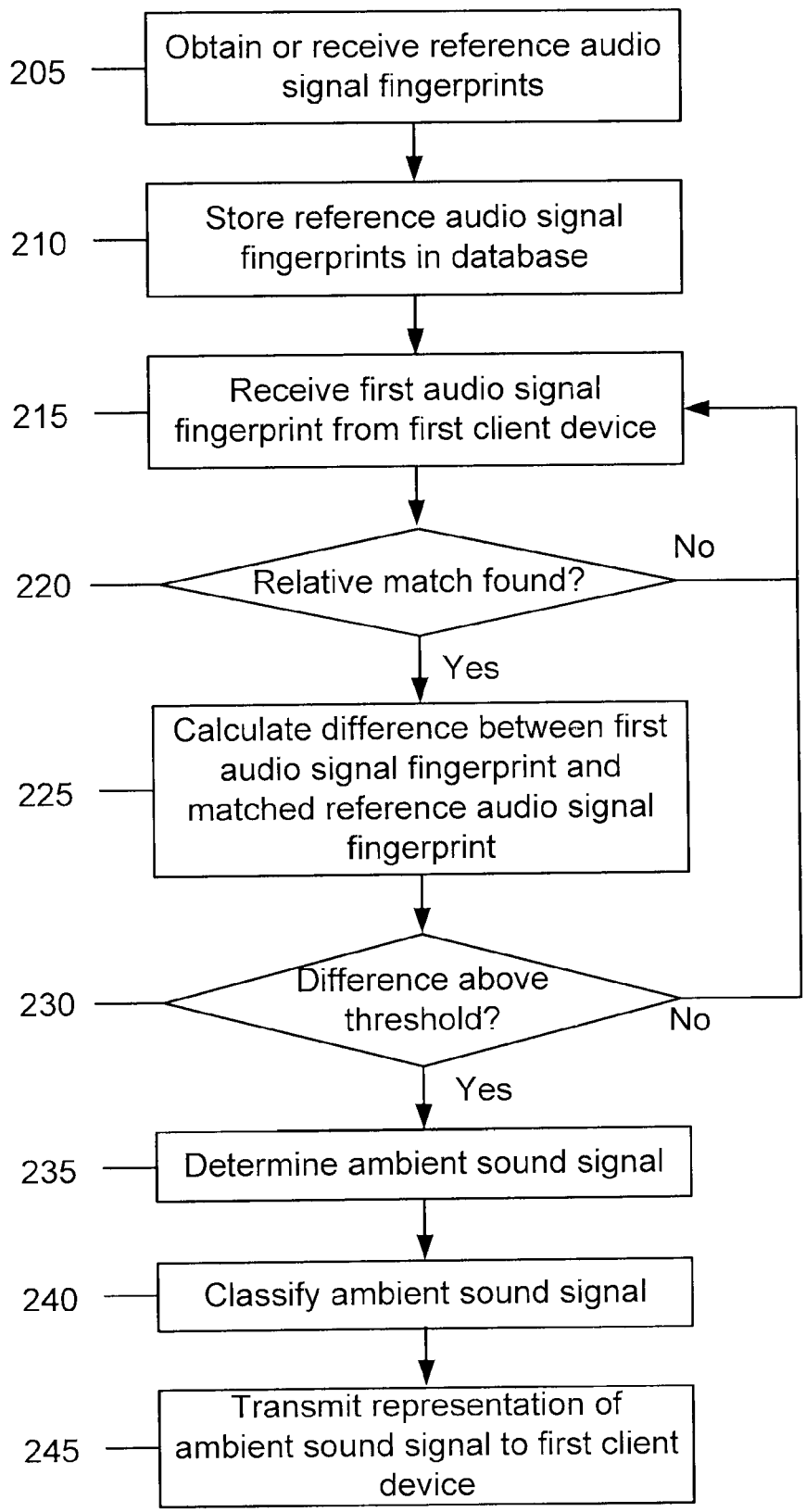
FIG. 2A is a flowchart illustrating steps performed by the server computer to determine an ambient sound signal in accordance with an embodiment of the present disclosure.

FIG. 2A shows a flowchart of an embodiment of steps performed by the server computer 130 to determine ambient sounds made by a user while experiencing a media program. The server computer 130 obtains or receives reference audio signal fingerprints 163 (Step 205). In one embodiment, the server computer 130 receives the reference audio signal fingerprints 163 from the reference device 162 (e.g., connected to the signal source (e.g., satellite receiver)). In another embodiment, the server computer 130 obtains the reference audio signal fingerprints 163 from an audio capture card located in the server computer 130. As stated above, the server computer 130 stores the reference audio signal fingerprints received or obtained in database 160 (Step 210). In one embodiment, the server computer 130 receives a reference audio signal and converts the reference audio signal into a reference audio signal fingerprint.

In one embodiment, the server computer 130 receives the first audio signal fingerprint 170 from the first client device 105 (Step 215). In another embodiment, the first client device 105 transmits the first audio signal to the server computer 130 and the server computer 130 converts the first audio signal into a fingerprint. The first audio signal is recorded by the first client device 105 while the user is experiencing (e.g., watching) the media program, and so the first audio signal includes the audio signal 152 of the media program (e.g., the sound emanating from the television 112) as well as any sounds (i.e., ambient sounds) made while experiencing the media program. The ambient sounds recorded by the first client device 105 can include sounds made by the user of the first client device 105, sounds made by other people in the room that the media program is playing in, sounds captured by the microphone of the first client device 105, etc.

In one embodiment, the reference audio signal fingerprint and/or the first audio signal fingerprint have embedded information, such as information about, for example, time (e.g., time stamps) and/or location.

Once the server computer 130 receives (or generates) the first audio signal fingerprint 170, the server computer 130 searches the database 160 for matching reference fingerprints (Step 220). In one embodiment, the server computer 130 finds a match when the first audio signal fingerprint 170 and the reference audio fingerprint 163 match above a threshold, such, by way of non-limiting example, 50% or 75% or 90% or a higher or lower percentage of the fingerprints are the same. If no match is found, the process returns to step 215. If a match is found, however, the server computer 130 determines a difference between the first audio signal fingerprint and the matched reference audio signal fingerprint (Step 225). In one embodiment, the server computer 130 determines whether the difference is above a threshold value (Step 230). If the difference is not above the threshold value, the process returns in one embodiment to step 215. If the difference is above the threshold value, the server computer 130 determines an ambient sound signal as the difference in the fingerprints (Step 235). In one embodiment, the first client device 105 requests permission from the user before transmitting the first audio signal or first audio signal fingerprint 170 to the server computer 130.

In one embodiment, the server computer 130 then classifies the ambient sound signal (Step 240) to determine the type of sound. For example, in one embodiment, the server computer 130 can determine that the ambient sound is laughter based on the length and/or amplitude of the ambient sound relative to the rest of the first audio signal. In another embodiment, the server computer 130 compares the ambient sound signal to sound signals stored in database 160. For example, the database 160 may store signals that represent cheering, laughter, crying, shouting, etc. The server computer 130 classifies the ambient sound signal based on this comparison (or a comparison of a fingerprint of the ambient sound signal) with signals stored in database 160.

Further, as described in more detail below, in the embodiment in which only fingerprint 170 is transmitted from the client device 105, the privacy concerns of transmitting a user's room audio are mitigated because fingerprints are not reversible—they cannot be reverse engineered to get the actual content (i.e., the actual audio signal), as a fingerprint is a hash.

In one embodiment, the server computer 130 determines that there is an amplitude spike in the ambient sound at a particular point in the experienced media program. The server computer 130 can determine that this spike represents laughter because the media program is a sitcom. In another embodiment, the media program is a baseball game between the NY Yankees and the Boston Red Sox. The server computer 130 can recognize geographic differences between the amplitude spikes in the ambient sounds of people in Boston and people in NY. Thus, in one embodiment, the server computer 130 determines that people in Boston cheered at a particular point in the game (e.g., when a Red Sox player hit a home run). This may be represented by a large amplitude spike in the ambient sounds (as cheering is typically louder than a reaction to something bad happening in the game).

In one embodiment, the server computer 130 determines the ratio of tonal noises and other noises in the ambient sound signal. In one embodiment, a spike in amplitude of a sound that is less tonal can represent laughter.

In one embodiment, a user has an avatar associated with the user's account with a service provider. Further, this user may have "friends" in a social network, and this avatar may be viewable by these other friends in the social network. In one embodiment, the avatar can be updated with emotions based on the ambient sounds produced by the user when watching a media program (Step 245). For example, the server computer 130 can make the user's avatar laugh when the user is laughing at a funny moment in a comedy program being watched, and further in one embodiment this avatar can be viewed by others, such as by other connections or "friends" of the user in the user's social network. In one embodiment, the user's social network status (e.g., FACEBOOK status) changes based on what the avatar is doing. In another embodiment, the avatar is a status indicator in a messaging environment.

Figure 2B:
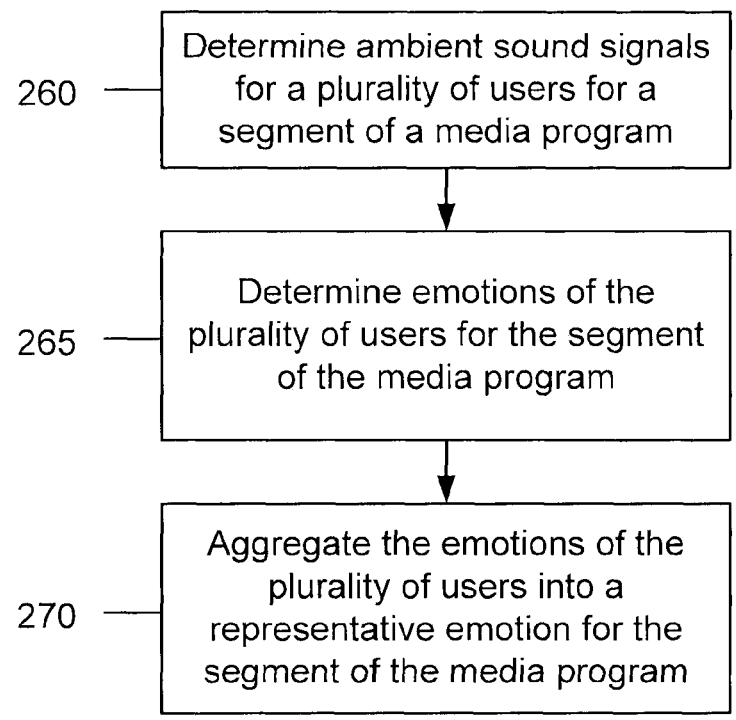
FIG. 2B is a flowchart illustrating steps performed by the server computer to determine a representative emotion in accordance with an embodiment of the present disclosure.

Also referring to FIG. 2B, in one embodiment, the server computer 130 receives a plurality of reference audio signal fingerprints 163 and a plurality of audio signal fingerprints (e.g., first audio signal fingerprint 170). In one embodiment, there is a one-to-many mapping—many more audio signal fingerprints are received (from many users) compared with reference audio signal fingerprints 163 received (from the media programs being broadcast). In this embodiment, the server computer 130 can determine many ambient sounds for many users (Step 260). The server computer 130 can then determine emotions for the many users (Step 265). In one embodiment, the server computer 130 (or ad server 140) can analyze these aggregate ambient sounds or emotions to promote advertisements (e.g., to send advertisements for a particular team to all users who cheered at a particular point in time during a sports program).

In one embodiment, the server computer 130 utilizes crowdsourcing to determine a representative emotion to a media program (Step 270). For example, the server computer 130 may receive many ambient sounds from different users experiencing the same media program in different locations while operating different client devices. The server computer 130 collects the large amounts of ambient sounds and aggregates the data to obtain an accurate representation of the ambient sounds associated with a segment of a media program. For example, if six hundred users are watching a particular comedy program, and five hundred of those users transmit ambient sounds to the server computer 130 and the ambient sounds associated with these five hundred users have a frequency range above a predetermined threshold or the sound extracted as the difference with the reference signal matches a laugh sound, in one embodiment the server computer 130 can determine that the five hundred users were laughing during the media program. Thus, the server computer determines the representative emotion (e.g., laughter) of many users to a segment of a media program (e.g., comedy program) based on the ambient sounds received from a plurality of users. The server computer utilizes "wisdom of the crowd" to infer properties of the media program (e.g., that a particular segment of the media program was funny).

In another embodiment, the server computer 130 provides or sells statistics to other companies, such as providing or selling statistics to a television network on how many people responded with laughter at a particular part of a new comedy program, how many people watched a particular media program, the representative emotion of users to a segment of the media program, etc. The television network may use these statistics to determine whether to keep a new media program on the air, to change the time slot of the new program, how much to charge for advertisements during the playing of the new program, etc. These statistics may also be used by television networks to determine what segments of shows to use in a commercial (e.g., segments that obtained many laughs), to determine points of interest in a show, or to determine what segments of a show to use as highlights during a news program (e.g., this part of a televised football game received a lot of cheers from people in the NY area).

Further, the balance, magnitude, and time distribution of the ambient sounds in a sports broadcast can indicate whether the game was exciting overall, had a tense finish, etc. Additionally, the server computer 130 can determine a "funniness score" for a sitcom based on a time-stamped aggregated laughter (or lack thereof). The server computer 130 may also create a synopses of the funnier moments of the sitcom based on the ambient sound or sounds from one or more users.

In one embodiment, the server computer 130 can cluster viewers into groups based on the nature of their ambient sounds. For example, when a group of users are watching a football game between team A and team B or other sporting event, the server computer 130 can analyze the ambient sounds for each user and classify the user as a fan of team A, a fan of team B, or a viewer who is indifferent to who wins. In one embodiment, the server computer 130 (or ad server 140) may then provide targeted ads to the different fans based on the fan's team.

Although described above as the first client device 105 and the reference device 162 transmitting fingerprints to the server computer 130, in another embodiment the first client device 105 and/or reference device 162 transmits the actual audio signal to the server computer 130. In this embodiment, the server computer 130 converts these audio signals into fingerprints for analysis and determination.

In another embodiment, the first client device 105 captures the first audio signal (which includes the ambient sounds) from the room but does not transmit this signal or its fingerprint to the server computer 130. In one embodiment, the first client device 105 performs spectrum analysis on the first audio signal to analyze frequencies of the first audio signal. In one embodiment, the first client device 105 determines that the user has laughed when a high concentration of amplitude (e.g., an amplitude spike) in a particular frequency range is present in the frequency domain representation of the first audio signal.

Figure 3:
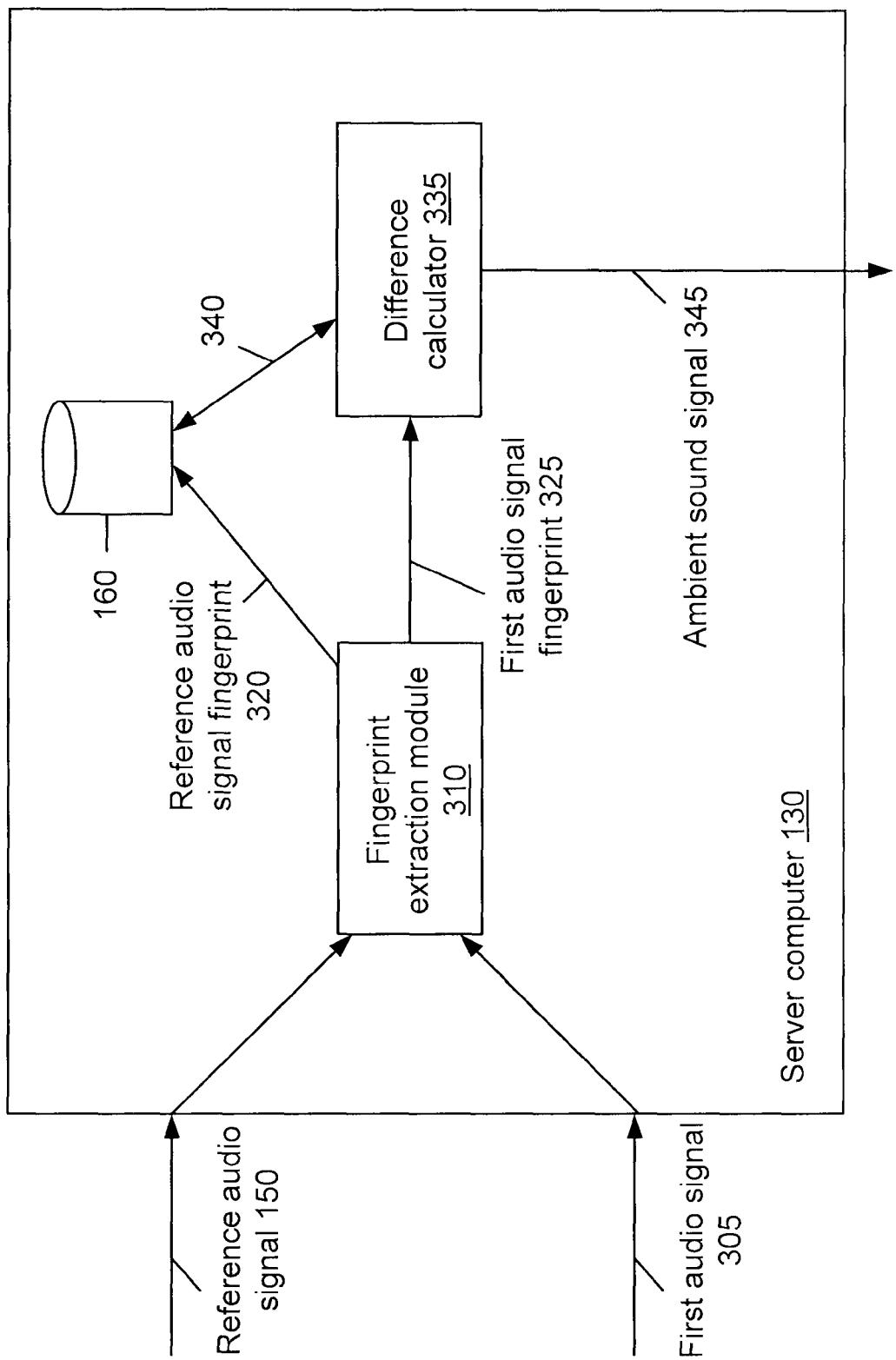
FIG. 3 is a block diagram of the server computer in accordance with an embodiment of the present disclosure.

FIG. 3 is a block diagram of server computer 130 in accordance with an embodiment of the disclosure. In one embodiment, the server computer 130 receives (e.g., continuously) the reference audio signal 150 (e.g., from the reference device 162 or from the source of the signal). In one embodiment, the server computer 130 also receives the first audio signal 305, which, as stated above, includes the audio signal 152 from the television 112 and ambient sounds 165. The server computer 130 inputs these signals 150, 305 into a fingerprint extraction module 310. Alternatively, in another embodiment, the server computer 130 receives fingerprints (e.g., from the reference device 162 and the first client device 105) corresponding to the reference audio signal 150 and the first audio signal 305. As described in more detail below, the fingerprint extraction module 310 determines an associated fingerprint for the signals 150, 305. The fingerprint extraction module 310 transmits a reference audio signal fingerprint 320 to the database 160 for storage. The database 160 may be located in the server computer 130 or may be in communication with the server computer 130. The fingerprint extraction module 310 transmits a first audio signal fingerprint 325 to a difference calculator 335. The difference calculator 335 is in communication with the database 160 (as shown with arrow 340) and locates one or more fingerprints in the database 160 that relatively match (e.g., are the same within a given threshold) the first audio signal fingerprint 325. The difference calculator 335 determines the ambient sound signal 345 corresponding to emotions of the user while watching the media program associated with the reference audio signal 150.

In one embodiment, the server matches and processes fingerprints generated by other devices (e.g., other reference devices and/or other client devices). Preferably, the reference fingerprint will be generated by a content fingerprinter (e.g., standalone machine connected to high quality audio source such as cable or satellite receiver or a machine embedded into a receiver). The audio signal fingerprint (e.g., first audio signal fingerprint 170) is generated by a client device from audio signal recorded from its microphone.

The following describes embodiments of the determination of a fingerprint from an audio signal such as the reference audio signal 150 and/or the first audio signal 305.

Fingerprint Overview

Figure 4:
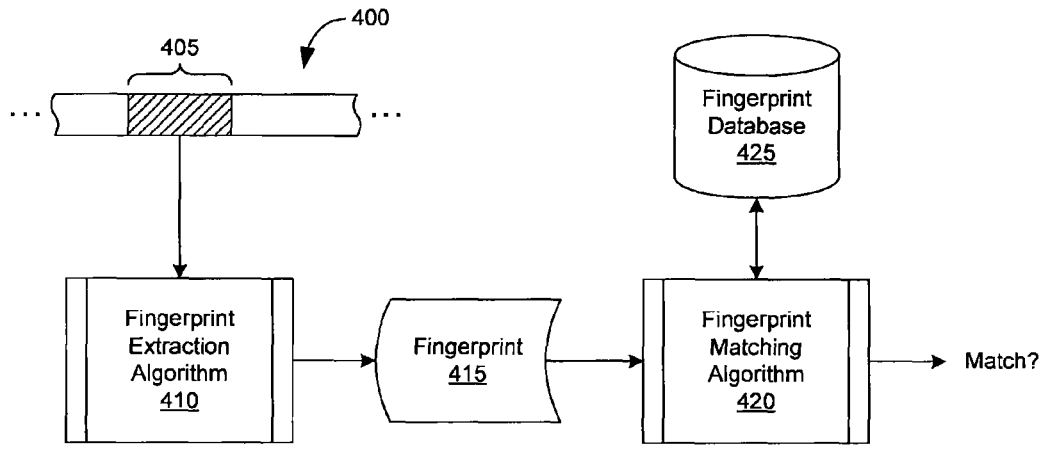
FIG. 4 is a schematic drawing of a process for extracting and using a fingerprint from an audio sample in accordance with an embodiment of the present disclosure.

Embodiments of the disclosure enable the extraction of characteristic information (e.g., an audio fingerprint) from a sample of audio as well as the matching or identification of the audio using that extracted characteristic information. As illustrated in FIG. 4, a frame 405 of audio taken from an audio sample 400 is input into a fingerprint extraction algorithm 410 (e.g., fingerprint extraction module 310). The audio sample 400 may be provided by any of a wide variety of sources. Using the sequence of audio frames 405, the fingerprint extraction algorithm 410 generates one or more audio fingerprints 415 that are characteristic of the sequence. Serving as a distinguishing identifier, the audio fingerprint 415 provides information relating to the identity or other characteristics of the sequence of frames 405 of the audio sample 400. In particular, one or more fingerprints 415 for the audio sample 400 may allow the audio sample 400 to be uniquely identified.

Once generated, the extracted fingerprint 415 can then be used in a further process or stored on a medium for later use. For example, the fingerprint 415 can be used by a fingerprint matching algorithm 420 (e.g., difference calculator 335), which compares the fingerprint 415 with entries in a fingerprint database 425 (e.g., a collection of audio fingerprints from known sources) to determine the identity of the audio sample 400.

The audio sample 400 may originate from any of a wide variety of sources, depending on the application of the fingerprinting system. In one embodiment, the audio sample 400 is sampled from a broadcast received from a media broadcaster and digitized. Alternatively, a media broadcaster may transmit the audio in digital form, obviating the need to digitize it. Types of media broadcasters include, but are not limited to, radio transmitters, satellite transmitters, and cable operators. The fingerprinting system can thus be used to audit these broadcasters to determine what audio are broadcast at what times. This enables an automated system for ensuring compliance with broadcasting restrictions, licensing agreements, and the like. Because the fingerprint extraction algorithm 410 may operate without having to know the precise beginning and ending of the broadcast signals, it can operate without the cooperation or knowledge of the media broadcaster to ensure independent and unbiased results.

In another embodiment, a media server retrieves audio files from a media library and transmits a digital broadcast over a network (e.g., the Internet) for use by the fingerprint extraction algorithm 410. A streaming Internet radio broadcast is one example of this type of architecture, where media, advertisements, and other content is delivered to an individual or to a group of users. In such an embodiment, the fingerprint extraction algorithm 410 and the matching algorithm 420 usually do not have any information regarding the beginning or ending times of individual media items contained within the streaming content of the audio sample 400; however, these algorithms 410 and 420 do not need this information to identify the streaming content.

In another embodiment, the fingerprint extraction algorithm 410 receives the audio sample 400, or a series of frames 405 thereof, from a client device that has access to a storage device containing audio files. The client device retrieves an individual audio file from the storage and sends the file to the fingerprint extraction algorithm 410 for generating one or more fingerprints 415 from the file. Alternatively, the client device may retrieve a batch of files from storage 440 and sends them sequentially to the fingerprint extractor 410 for generating a set of fingerprints for each file. (As used herein, "set" is understood to include any number of items in a grouping, including a single item.) The fingerprint extraction algorithm 410 may be performed by the client device or by a remote server coupled to the client device over a network.

Algorithm

Figure 5:
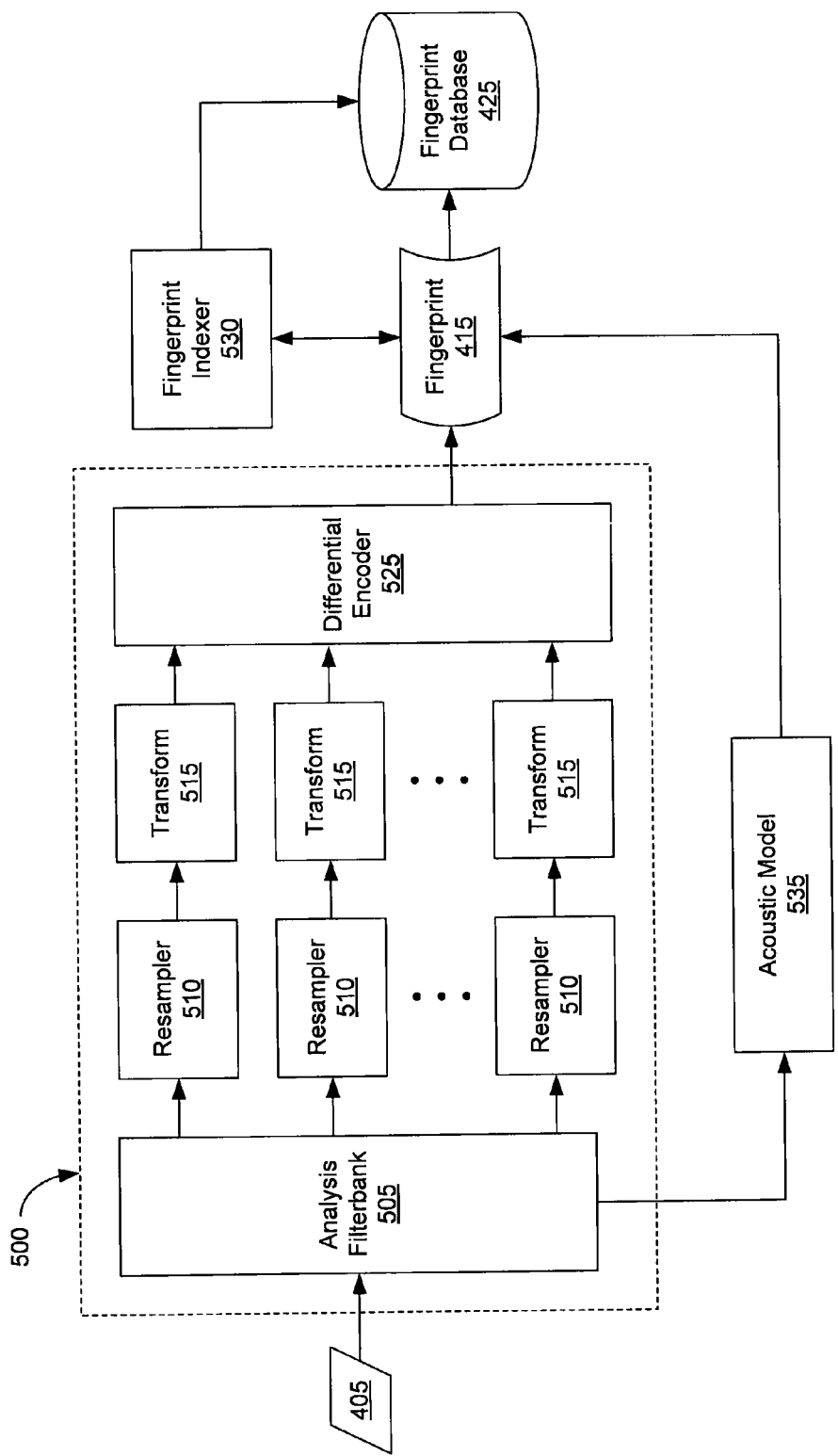
FIG. 5 is a schematic diagram of a fingerprint extraction system in accordance with an embodiment of the present disclosure.

One embodiment of a fingerprint extraction system 500 that implements the fingerprint extraction algorithm 410 shown in FIG. 4 is illustrated in FIG. 5. The fingerprint extraction system 500 comprises an analysis filterbank 505, which is coupled to a plurality of processing channels (each including one or more processing modules, labeled here as elements 510 and 515), which are in turn coupled to a differential encoder 525 for producing an audio fingerprint 415. The fingerprint extraction system 500 is configured to receive an audio frame 405, for which an audio fingerprint is to be generated.

Described in more detail below, for every input audio frame 405 the analysis filterbank 505 generally computes power spectrum information for a received signal across a range of frequencies. In one embodiment, each processing channel corresponds to a frequency band within that range of frequencies, which bands may overlap. Accordingly, the channels divide the processing performed by the fingerprint extraction system 500 so that each channel performs the processing for a corresponding band. In another embodiment, each processing channel processes multiple frequency bands (i.e., multiple frequency bands are associated with each processing channel). In other embodiments, the processing for the plurality of bands may be performed in a single channel by a single module, or the processing may be divided in any other configuration as appropriate for the application and technical limitations of the system.

The analysis filterbank 505 receives an audio frame 405 (such as the frame 405 from the audio sample 400 illustrated in FIG. 4). The analysis filterbank 505 converts the audio frame 405 from the time domain into the frequency domain to compute power spectrum information for the frame 405 over a range of frequencies. In one embodiment, the power spectrum for the signal in a range of about 250 to 2250 Hz is split into a number of frequency bands (e.g., Y bands, where Y=13). The bands may have a linear or a logarithmic mid-frequency distribution (or any other scale) and also may overlap. The output of the filterbank contains a measure of the energy of the signal for each of a plurality of bands. In one embodiment, the measure of the average energy is taken using the cubic root of the average spectral energy in the band.

Various implementations of the analysis filterbank 505 are possible, depending on the software and hardware requirements and limitations of the system. In one embodiment, the analysis filterbank 505 comprises a number of band-pass filters that isolate the signal of the audio frame 405 for each of the frequency bands followed by energy estimation and down sampling. In one embodiment, the frequencies passed by each band-pass filter vary with time. In another embodiment, the frequencies passed by each band-pass filter are constant (i.e., do not vary with time).

In another embodiment, the analysis filterbank 505 is implemented using a short-time Fast Fourier Transform (FFT). For example, the audio 400 sampled at 8 kHz is segmented into 64-ms frames 405 (i.e., 512 samples). The power spectrum of each 50% overlapped segment consisting of two audio frames 405 (i.e. 1024 samples) is then calculated by Han windowing and performing an FFT, followed by band filtering using M evenly or logarithmically spaced overlapped triangle windows.

A variety of time-frequency domain transforms may be used instead of the FFT described above. For example, a Modified Discrete Cosine Transform (MDCT) may be used. One advantage of the MDCT is its low complexity, as is may be computed using only one n/4 point FFT and some pre- and post-rotation of the samples. Accordingly, a filterbank 505 implemented with MDCT is expected to perform better than one implemented with a FFT, e.g., able to calculate transforms twice as fast.

In another embodiment, the analysis filterbank 505 is implemented using the MP3 hybrid filterbank, which includes a cascading polyphase filter and a MDCT followed by aliasing cancellation. The MP3 filterbank produces 576 spectral coefficients for every frame 405 of audio consisting of 576 samples. For audio sampled at 8 kHz, the resulting frame rate is 13.8 fps compared to 15.626 fps of a 1024-point FFT filterbank described above. The frame rate difference is set off during the time-frequency analysis when the data are resampled, as discussed below. The analysis filterbank 505 may also be implemented using a Quadrature Mirror Filter (QMF). The first stage of MP3 hybrid filterbank employs a QMF filter with 32 equal-width bands. Accordingly, the 250 to 2250-Hz frequency range of an 11,025-Hz audio signal may thus be divided into 13 bands.

One advantage of the MP3 filterbank is its portability. There are highly optimized implementations of MP3 filterbanks for different CPUs. Accordingly, the fingerprint generation routine can be easily integrated with the MP3 encoder, which may obtain spectral coefficients from the MP3 filterbank without additional processing. Accordingly, the fingerprint generation routine can be easily integrated with the MP3 decoder, which may obtain spectral data directly from a MP3 bit stream without its complete decoding. Integration with other audio codecs is also possible.

Acoustic Model

In various applications of the fingerprinting system, certain frequency bands may be insignificant because they are imperceptible, because an encoding process for the audio sample removed the bands, or for some other reason. In one embodiment, therefore, an acoustic model 535 is used to identify and mark the insignificant frequency bands for a particular fingerprint. Acoustic models, such as the psychoacoustic model, are well known in various audio processing fields. A set of model parameters for the acoustic model 535 can be calculated for high quality reference samples during the creation of a fingerprint 415 and stored in the database 425. The insignificant bands in the fingerprint 415 can be marked by assigning a special code or zeroing out their corresponding values (i.e., bits). This effectively causes the bands to be ignored in any subsequent matching process, since in the process of matching of a fingerprint with the database records, only pairs of correspondent bands that have non-zero values are used to distinguish the fingerprint 415. Masked bands (i.e., those having zero values) may also be excluded from comparison altogether.

In one embodiment, the acoustic model is a psychoacoustic model for the human auditory system. This may be useful where the purpose of the fingerprinting system is the identification of audio targeted human auditory system. Such audio may be compressed by one or more perceptual encoders removing irrelevant audio information. The use of the human psycho acoustic model allows identifying and excluding such irrelevant bands from the fingerprints.

But the psychoacoustic model is just one type of an acoustic model that is suited to human perceptual encoded audio. Another acoustic model is a model that mimics the properties of a specific recording device. Each band for such a recording device acoustic model may have a weight factor assigned to it depending on its importance. Yet another acoustic model mimics the properties of specific environments, such as background noise found in a vehicle or room. In such an embodiment, each band for the acoustic model may have a weight factor assigned to it depending on its importance in the environment for which the system is designed.

In one embodiment, parameters of the acoustic model 535 and filterbank 505 depend on the type and properties of the analyzed audio signal 400. Different profiles comprising a set of subband weight factors and a number of filterbank bands and their frequency distributions are used to obtain a better match of the properties of the targeted audio signal. For speech-like audio, for example, the power of the signal is mainly concentrated in low frequency bands, while music might contain higher frequency relevant components depending on genre. In one embodiment, the parameters of the acoustic model are calculated from the reference audio signal and stored in content database together with generated fingerprints. In another embodiment, the parameters of the acoustic model are calculated dynamically based on properties of analyzed audio signal during the matching process.

Accordingly, possible applications of the acoustic model 535 include tuning the audio recognition parameters for specific environment and/or recording device and encoding algorithm properties. For example, knowing acoustical properties of the cell phone audio path (microphone characteristics, audio processing and compression algorithms, and the like) allows the development of an acoustic model that mimics these properties. Using this model during fingerprint comparison may significantly increase robustness of the matching process of the generated fingerprints.

Fingerprint Indexing and Matching

In one embodiment, a fingerprint indexer 530 generates an index for each fingerprint 415. The fingerprints 415 are then stored in the fingerprint database 425, allowing for efficient searching and matching of the contents of the fingerprint database 425. In an embodiment, the index for a fingerprint 415 comprises a portion or a hash of the fingerprint 415. Accordingly, the fingerprints 415 in the fingerprint database 425 are indexed according to useful identifying information about them.

In an embodiment described above in which each fingerprint 415 comprises a $[(Y-1) \times N/4]$ matrix of bits, the indexer 530 uses the bits from the leftmost columns as the index. In the example where each fingerprint 415 is a 12 by 8 matrix of bits, the index for the fingerprint 415 may be the leftmost two columns of bits (24 bits total). In this way, the bits used as the index for each fingerprint 415 are a subset of the fingerprint 115 that are based on the low frequency spectral coefficients of the feature vectors used to compute the fingerprint 415. These bits thus correspond to the low frequency components of the resampled and transformed spectrogram bands, which are stable and insensitive to moderate noise and distortions. With a high level of probability, therefore, similar fingerprints would have the same numerical value of the index. In this way, the index may be used to label and group similar and likely matching fingerprints in database.

Figure 6:
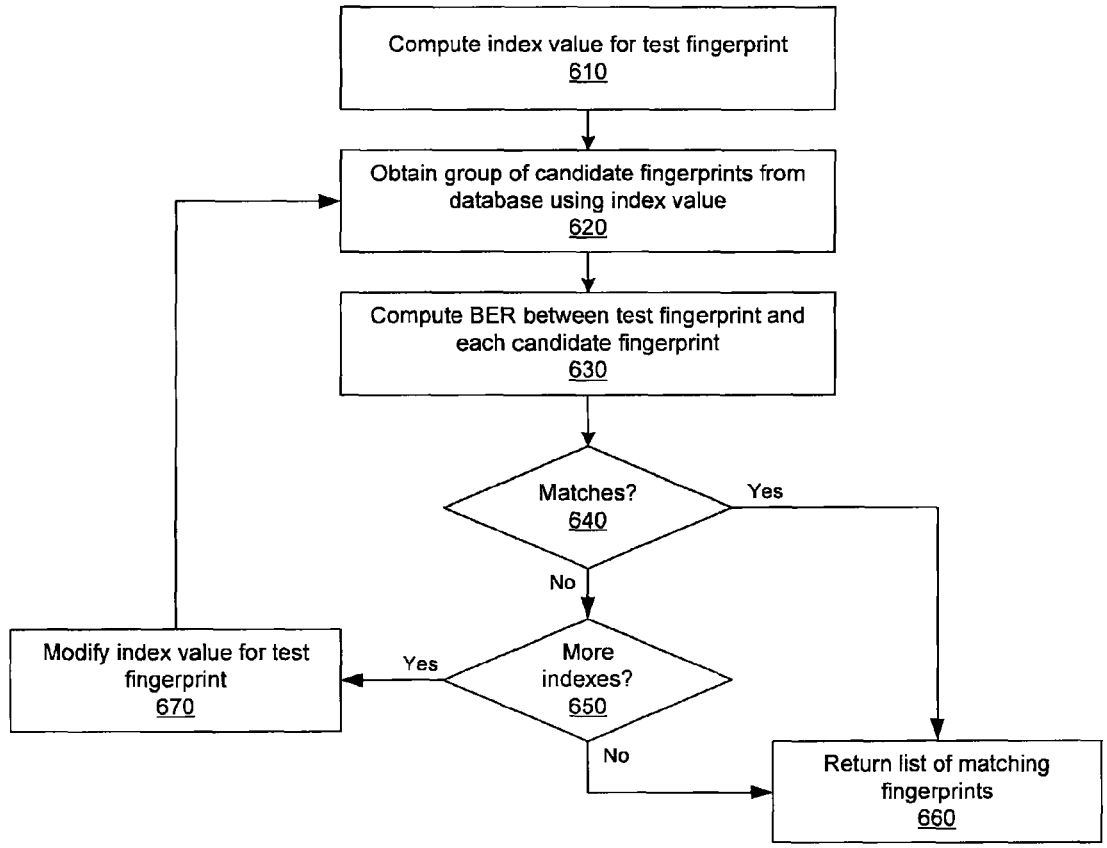
FIG. 6 is a flow diagram of a matching algorithm in accordance with an embodiment of the present disclosure.

FIG. 6 illustrates a method of matching a test fingerprint to the fingerprint database 425 using the indexes described above, in accordance with one embodiment of the invention. To find a match in the fingerprint database 425 for a test fingerprint, the matching algorithm begins by computing 610 an index value for the test fingerprint as described above. Using this index value, a group of candidate fingerprints is obtained 620, for example, where the group includes all of the fingerprints in the database 425 that have the same index value. As explained above, it is highly likely that any matches in the database 425 are in this group of candidate fingerprints because of the way the index value is computed.

To test for any matches in the group of candidate fingerprints, a bit error rate (BER) between the test fingerprint and each candidate fingerprint is computed 630. The BER between two fingerprints is the percentage of their corresponding bits that do not match. For unrelated completely random fingerprints, the BER would be expected to be 50%. In one embodiment, two fingerprints are matching where the BER is less than about 35%; however, other numerical limits may be used depending on the desired tolerance for false positives and/or false negatives. In addition, calculations or criteria other than BER can be used to compare two fingerprints. For example, the inverse measure of BER, the match rate may be also used. Moreover, certain bits may be weighted more highly than others in the comparison of two fingerprints.

If 640 there are no matches within the predetermined matching criteria, or if 650 there are no more indexes to modify, the matching algorithm has failed to find any matches of the test fingerprint in the database 425. The system may then continue to search (e.g., using less restrictive criteria in obtaining the candidate fingerprints) or may stop. If 640 there are one or more matching fingerprints, a list of the matching fingerprints is returned 660.

In one embodiment, the system may repeat the search as described above after modifying 670 the calculated fingerprint index in order to obtain a different set of candidate fingerprints from which to search for a match. To modify 670 the calculated fingerprint index, one or multiple bits of the calculated fingerprint index may be flipped. In one example where the fingerprint index has 24 bits, after failing to find a match using the original fingerprint index, the search step is repeated 24 times with a different single bit of the 24-bit fingerprint index flipped each time. Various other techniques can be used to enlarge the search space.

In one embodiment, the fingerprint indexer 530 generates one or more indexes by selecting index bits from one or more fingerprints based on a set of frequency band weight factors calculated by the acoustic model 535 and previously stored in the database 425. When multiple indexes are used, including indices obtained by bit flipping, the group of candidate fingerprints includes all candidates obtained for every calculated index.

In another embodiment, the area of search may be narrowed by prescreening and selecting only fingerprint candidates found in most or all candidate groups obtained for each calculated index. Prescreening of the multiple fingerprint candidates groups by using multiple indices, including indices obtained by bit flipping, may significantly improve the performance of the database search. In one embodiment, indexes and references to possible fingerprint candidates are stored in computer memory allowing fast selection and prescreening of the fingerprint candidates. On the second step (step 620), only fingerprint candidates that have the highest probability to match given fingerprint are loaded into computer memory and compared. This approach allows fast search by keeping only small indices in computer memory, while storing larger fingerprints on slow devices (e.g., a hard drive or over a network).

Detecting Edges of an Audio Frame

In some applications, it may be desirable to detect the edges of a matching audio fragment. Edge detection allows the system to know precisely where a particular matching audio fragment occurs in time. Depending on the quality of the analyzed audio, embodiments of the edge detection algorithm may be able to detect the edges of a matching audio fragment with about 0.1 to 0.5 seconds of precision.

Figure 7:
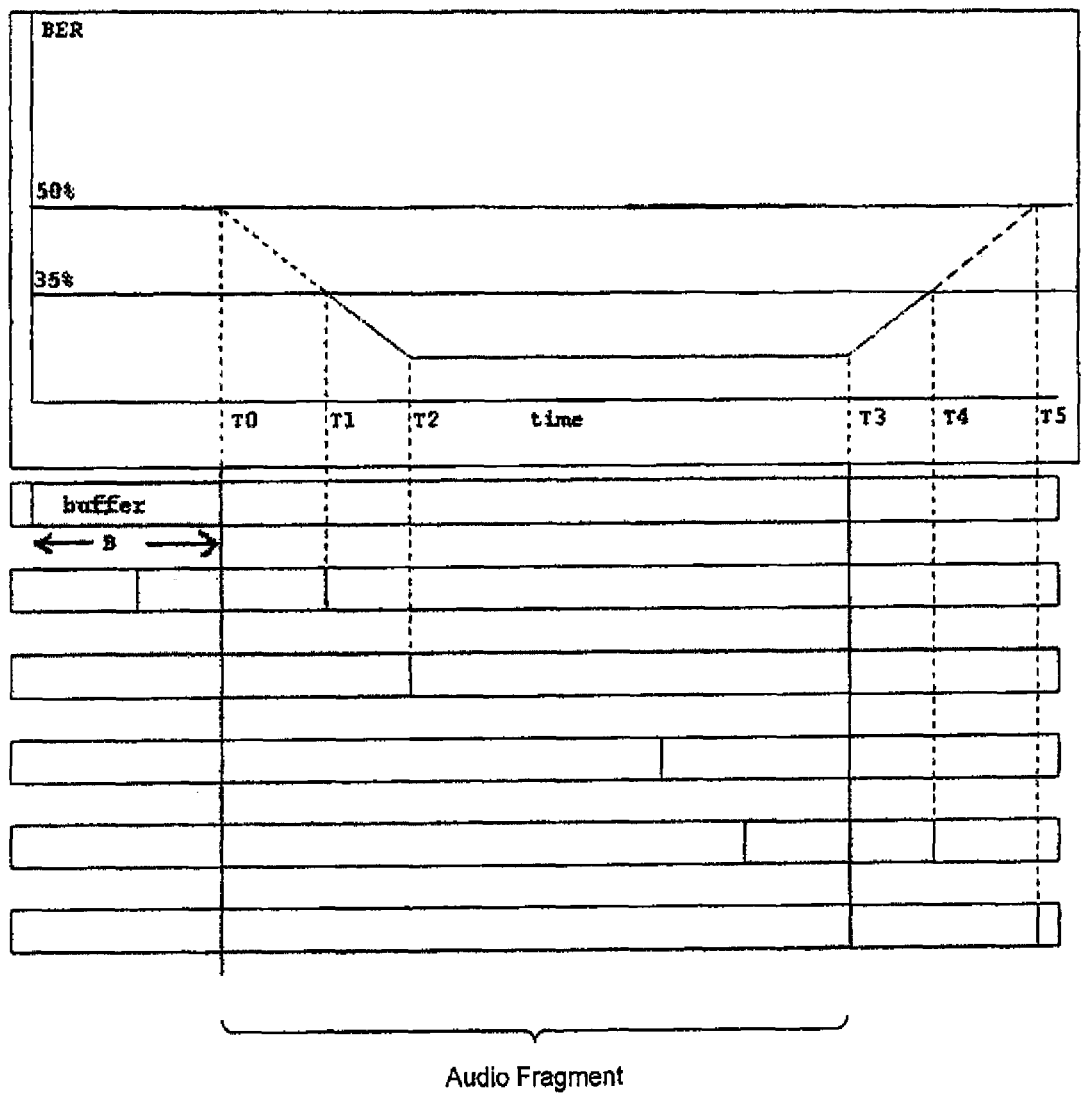
FIG. 7 illustrates an edge detection algorithm in accordance with an embodiment of the present disclosure.

As explained above, embodiments of the fingerprinting technique accumulate audio samples in sub-band processing buffers. Because of this buffering, the output of the fingerprinting algorithm is delayed and smeared on audio fragment edges. This effect is illustrated in FIG. 7, which is a graph of the bit error rate (BER) over time between reference fingerprints for an audio fragment and a series of fingerprints generated over time for an incoming sample audio stream. In the embodiment illustrated, the sub-band buffers hold three seconds of audio, and a match is declared when two fingerprints have a bit error rate (BER) of 35% or less.

Initially, at time T0, the sub-band processing buffers are empty, and the generated fingerprint thus produces zero matches with the original audio (i.e., the BER is expected to be approximately equal to 50%). As audio samples are added to the sub-band buffers the BER decreases, indicating a better match. After sufficient time passes, the BER decreases below the threshold 35% at time T1, indicating a match. Finally, at time T2, the BER reaches a plateau as the buffers are filled by samples. When the fingerprinting algorithm passes the end of the correspondent audio fragment, at time T3, it begins to produce fingerprints that match less and thus have an increasing BER, which reaches the recognition threshold 35% at time T4. The duration of obtained match curve (T1-T4) and the duration of the plateau (T2-T3) are each shorter than the duration of the matched audio fragment (T0-T3).

In one embodiment, an edge detection algorithm is used to determine the exact edges of a matching audio frame or fragment. A BER curve such as illustrated in FIG. 7 is obtained. The BER curve is segmented into regions, which correspond to the beginning of match with decreasing BER (e.g., T1-T2), the plateau with approximately constant BER (e.g., T2-T3), and the end of match with increasing BER (e.g., T3-T4). Because a real BER curve will generally be noisy, it is segmented using an appropriate technique such as a regression analysis. In one embodiment, all samples that produce BER above 35% are ignored because they may not be reliable. The beginning of the matching audio fragment (i.e., time T1) may then be calculated using linear regression as the crossing of a line that fits in the best way a decreasing BER region (e.g., T1-T2) with a horizontal line that corresponds to 50% BER. A similar approach may be applied to estimate time T5, taking the intersection of a line that fits in the best way an increasing BER region (e.g., T3-T4) and a horizontal line that corresponds to 50% BER. In this case, however, time T5 corresponds to the end of the fragment delayed by the duration B of the sub-band buffer, not the actual end of the matching audio fragment. The location of the end of the fragment (i.e., time T3) can be calculated by subtracting the sub-band buffer duration B from the obtained estimate T5.

In another embodiment, the end of the matching audio fragment is estimated as the end of the region T2-T3, and the beginning of the audio fragment is calculated by subtracting the duration of the sub-band buffer B from time T2, which corresponds to the beginning of the region T2-T3.

SUMMARY

Although discussed in terms of vectors and matrices, the information computed for any fingerprint or sub-fingerprint may be stored and processed in any form, not just as a vector or matrix of values. The terms vector and matrix are thus used only as a convenient mechanism to express the data extracted from an audio sample and is not meant to be limiting in any other way. In addition, although the power spectrum is discussed in terms of a spectrogram, it is understood that the data representing the power spectrum or spectral analysis of an audio signal may be represented and used not only as a spectrogram, but in any other suitable form.

In one embodiment, a software module is implemented with a computer program product comprising a computer-readable medium containing computer program code, which can be executed by a computer processor for performing any or all of the steps, operations, or processes described herein. Accordingly, any of the steps, operations, or processes described herein can be performed or implemented with one or more software modules or hardware modules, alone or in combination with other devices. Moreover, any portions of the system described in terms of hardware elements may be implemented in software, and any portions of the system described in terms of software elements may be implemented in hardware, such as hard-coded into a dedicated circuit. For example, code for performing the methods described can be embedded in a hardware device, for example in an ASIC or other custom circuitry. This allows the benefits of the invention to be combined with the capabilities of many different devices.

In another embodiment, the fingerprinting algorithm is embedded in and run on any of a variety of audio devices, such as a cellular phone, a personal digital assistant (PDA), a MP3 player and/or recorder, a set-top box, a television set, DVR, cable/satellite receiver, a game console or any other device that stores, processes or plays audio content. Embedding the fingerprinting algorithm on such a device may have a number of benefits. For example, generating audio fingerprints directly on a cellular phone would provide better results compared to sending compressed audio from the phone to a fingerprinting server over cell network. Running the algorithm on the cellular phone eliminates distortions caused by GSM compression, which was designed to compress speech and performs poorly on music. Accordingly, this approach may significantly improve the recognition of audio recorded by a cellular phone. It also reduces the load on servers as well as network traffic.

As describe above, another benefit of such an embedded approach is the ability to monitor listening experience without violation of privacy and user rights. For example, a recording device may record audio, create fingerprints, and then send only fingerprints to a server for analysis. The recorded audio never leaves the device. The server may then identify targeted music or advertisements using the sent fingerprints, even though it would be impossible to recover the original audio from the fingerprints.

Figure 8:
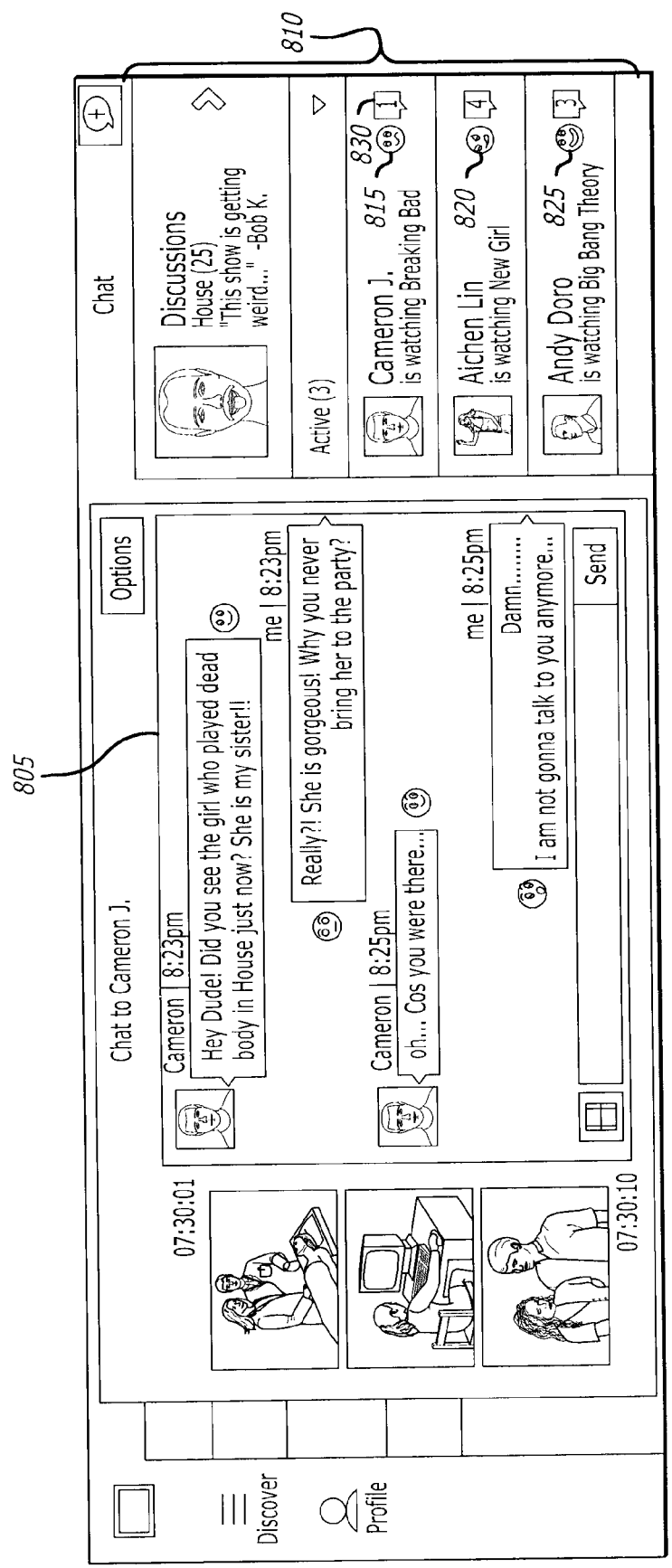
FIG. 8 is an example of a displayed user interface of the client device depicting an active chat mode in accordance with an embodiment of the present disclosure.

FIG. 8 is an example of a displayed user interface of the first client device 105 depicting an active chat mode. The chat mode is active via chat screen 805 showing a chat session between the user of the first client device 105 and someone named Cameron J. The chat session involves a discussion of the TV show House. The right panel 810 of the user interface shows a list of "friends" watching different live TV programs. The right panel 810 includes emotion icons (e.g., emotion icons 815, 820, and 825) representing the user's emotional state. In one embodiment, each emotion icon 815, 820, 825 changes in real-time (e.g., based on the determined ambient sound signal). In one embodiment, each number (e.g., number 830) next to the emotion icon (e.g., emotion icon 815) represents the number of comments submitted by that particular user. Thus, in one embodiment the first client device 105 can, once the media program is identified, enable a user watching the media program to have a discussion with one or more other people watching the media program.

Figure 9:
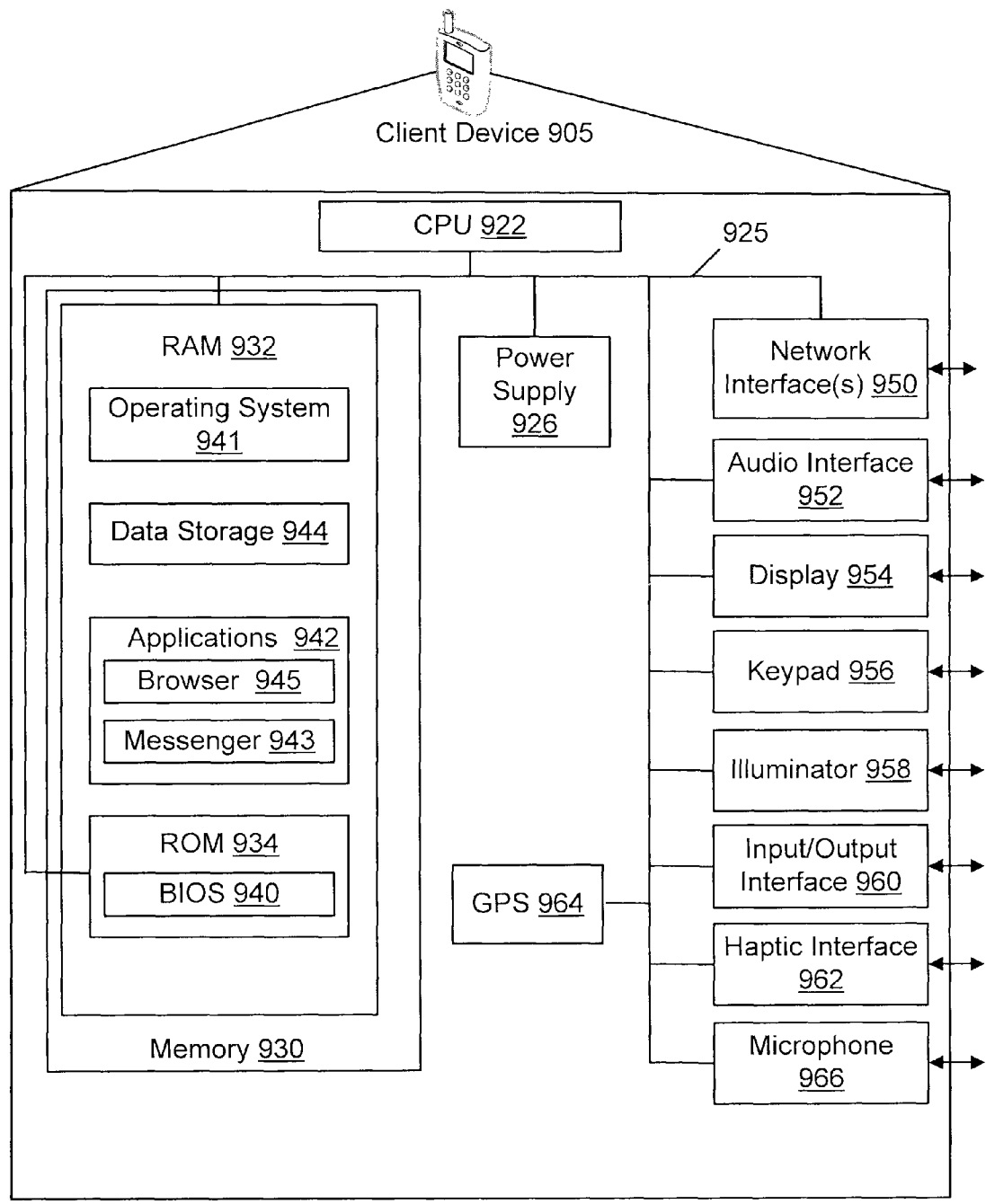
FIG. 9 is a block diagram of components of a client device in accordance with an embodiment of the present disclosure.

FIG. 9 shows one example of a schematic diagram illustrating a client device 905 (e.g., client device 105). Client device 905 may include a computing device capable of sending or receiving signals, such as via a wired or wireless network. A client device 905 may, for example, include a desktop computer or a portable device, such as a cellular telephone, a smartphone, a display pager, a radio frequency (RF) device, an infrared (IR) device, a Personal Digital Assistant (PDA), a handheld computer, a tablet computer, a laptop computer, a digital camera, a set top box, a wearable computer, an integrated device combining various features, such as features of the foregoing devices, or the like.

The client device 905 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text, pictures, etc. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device 905 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As shown in the example of FIG. 9, client device 905 may include one or more processing units (also referred to herein as CPUs) 922, which interface with at least one computer bus 925. A memory 930 can be persistent storage and interfaces with the computer bus 925. The memory 930 includes RAM 932 and ROM 934. ROM 934 includes a BIOS 940. Memory 930 interfaces with computer bus 925 so as to provide information stored in memory 930 to CPU 922 during execution of software programs such as an operating system 941, application programs 942, device drivers, and software modules 943, 945 that comprise program code, and/or computer-executable process steps, incorporating functionality described herein, e.g., one or more of process flows described herein. CPU 922 first loads computer-executable process steps from storage, e.g., memory 932, data storage medium/media 944, removable media drive, and/or other storage device. CPU 922 can then execute the stored process steps in order to execute the loaded computer-executable process steps. Stored data, e.g., data stored by a storage device, can be accessed by CPU 922 during the execution of computer-executable process steps.

Persistent storage medium/media 944 is a computer readable storage medium(s) that can be used to store software and data, e.g., an operating system and one or more application programs. Persistent storage medium/media 944 can also be used to store device drivers, such as one or more of a digital camera driver, monitor driver, printer driver, scanner driver, or other device drivers, web pages, content files, playlists and other files. Persistent storage medium/media 906 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 905 can also include one or more of a power supply 926, network interface 950, audio interface 952, a display 954 (e.g., a monitor or screen), keypad 956, illuminator 958, I/O interface 960, a haptic interface 962, a GPS 964, a microphone 966, a video camera, TV/radio tuner, audio/video capture card, sound card, analog audio input with A/D converter, modem, digital media input (HDMI, optical link), digital I/O ports (RS232, USB, FireWire, Thunderbolt), expansion slots (PCMCIA, ExpressCard, PCI, PCIe).

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Figure 10:
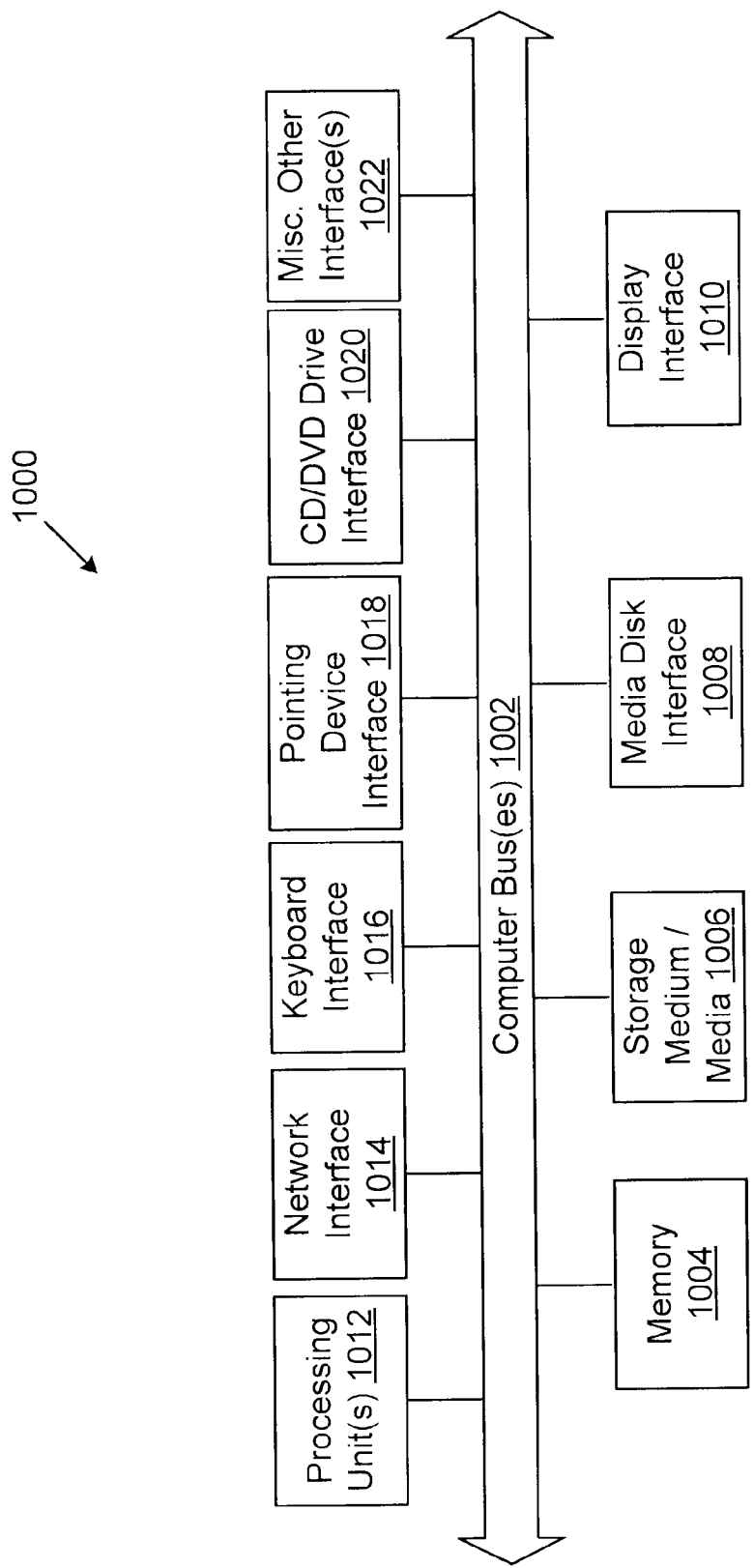
FIG. 10 is a block diagram illustrating an internal architecture of a computer in accordance with an embodiment of the present disclosure.

FIG. 10 is a block diagram illustrating an internal architecture of an example of a computer, such as server computer 130, 140 and/or client device 105, 110, in accordance with one or more embodiments of the present disclosure. A computer as referred to herein refers to any device with a processor capable of executing logic or coded instructions, and could be a server, personal computer, set top box, tablet, smart phone, pad computer or media device, to name a few such devices. As shown in the example of FIG. 10, internal architecture 1000 includes one or more processing units (also referred to herein as CPUs) 1012, which interface with at least one computer bus 1002. Also interfacing with computer bus 1002 are persistent storage medium/media 1006, network interface 1014, memory 1004, e.g., random access memory (RAM), run-time transient memory, read only memory (ROM), etc., media disk drive interface 1008 as an interface for a drive that can read and/or write to media including removable media such as floppy, CD-ROM, DVD, etc. media, display interface 1010 as interface for a monitor or other display device, keyboard interface 1016 as interface for a keyboard, pointing device interface 1018 as an interface for a mouse or other pointing device, and miscellaneous other interfaces not shown individually, such as parallel and serial port interfaces, a universal serial bus (USB) interface, and the like.

Memory 1004 interfaces with computer bus 1002 so as to provide information stored in memory 1004 to CPU 1012 during execution of software programs such as an operating system, application programs, device drivers, and software modules that comprise program code, and/or computer-executable process steps, incorporating functionality described herein, e.g., one or more of process flows described herein. CPU 1012 first loads computer-executable process steps from storage, e.g., memory 1004, storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

As described above, persistent storage medium/media 1006 is a computer readable storage medium(s) that can be used to store software and data, e.g., an operating system and one or more application programs. Persistent storage medium/media 1006 can also be used to store device drivers, such as one or more of a digital camera driver, monitor driver, printer driver, scanner driver, or other device drivers, web pages, content files, playlists and other files. Persistent storage medium/media 1006 can further include program modules and data files used to implement one or more embodiments of the present disclosure.

Internal architecture 1000 of the computer can include (as stated above), a microphone, video camera, TV/radio tuner, audio/video capture card, sound card, analog audio input with A/D converter, modem, digital media input (HDMI, optical link), digital I/O ports (RS232, USB, FireWire, Thunderbolt), and/or expansion slots (PCMCIA, ExpressCard, PCI, PCIe).

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
    storing, by a server computer, a plurality of reference audio signal fingerprints, each reference audio signal fingerprint associated with a reference audio signal of a media program;
    for each user in a plurality of users,
    receiving, by the server computer, a first audio signal fingerprint from a client device operated by a user, the first audio signal fingerprint associated with a first audio signal comprising ambient sound associated with the user and an audio signal of the media program;
    searching, by the server computer, the stored plurality of reference audio signal fingerprints to determine one of the stored plurality of reference audio signal fingerprints that matches the first audio signal fingerprint above a given threshold;
    extracting, by the server computer, an ambient sound signal comprising the ambient sound from the first audio signal fingerprint by obtaining a difference between the one of the stored plurality of reference audio signal fingerprints and the first audio signal fingerprint, the obtaining a difference comprising obtaining a frequency range of the first audio signal;
    determining, by the server computer, using the ambient sound signal, an emotion of the user for a segment of the media program; and aggregating, by the server computer, the emotion of each user to determine a representative emotion of the plurality of users for the segment of the media program.

2. The method of claim 1, wherein the determining of the emotion of the user further comprises determining an amplitude of the ambient sound signal.

3. The method of claim 1, wherein the determining of the emotion of the user further comprises performing a spectrum analysis of the ambient sound signal to classify the ambient sound signal.

4. The method of claim 1, wherein the aggregating of the emotion of each user to determine a representative emotion of the plurality of users further comprises comparing the ambient sound signal of the user with a plurality of other ambient sound signals associated with other users in different locations.

5. The method of claim 1, wherein the determining, from the ambient sound signal, of an emotion of the user further comprises determining, from the ambient sound signal, an emotion selected from a group of emotions consisting of laughing, crying, cheering, screaming, clapping, booing, stomping, singing, and sound made by an instrument.

6. The method of claim 1, wherein the receiving of the first audio signal fingerprint comprising ambient sound associated with the user further comprises receiving the first audio signal fingerprint comprising ambient sound associated with the user and with other people in an area associated with the user.

7. The method of claim 1, further comprising transmitting the determined emotion of the user to the client device.

8. The method of claim 7, wherein the transmitting of the determined emotion further comprises transmitting an advertisement to the client device.

9. The method of claim 1, further comprising updating a status on a social networking site based on the emotion.

10. The method of claim 1, wherein the aggregating of the emotion of each user to determine a representative emotion of the plurality of users further comprises identifying that the segment of the media program should be a highlight of the media program.

11. The method of claim 1, further comprising transmitting a recommendation that the media segment should be a highlight of the media program to a third party.

12. The method of claim 1, wherein the aggregating further comprises identifying a team that the user is cheering for in the media program.

13. The method of claim 1, wherein the aggregating further comprises providing show synopsis of the media program based on the representative emotion of the plurality of users.

14. A computing device comprising:
a processor;
a storage medium for tangibly storing thereon program logic for execution by the processor, the program logic comprising:
storing logic executed by the processor for storing a plurality of reference audio signal fingerprints, each reference audio signal fingerprint associated with a reference audio signal of a media program;
for each user in a plurality of users,
receiving logic executed by the processor for receiving a first audio signal fingerprint from a client device operated by a user, the first audio signal fingerprint associated with a first audio signal comprising ambient sound associated with the user and an audio signal of the media program;
searching logic executed by the processor for searching the stored plurality of reference audio signal fingerprints to determine one of the stored plurality of reference audio signal fingerprints that matches the first audio signal fingerprint above a given threshold;
first extracting logic executed by the processor for extracting an ambient sound signal comprising the ambient sound from the first audio signal fingerprint by obtaining a difference between the one of the stored plurality of reference audio signal fingerprints and the first audio signal fingerprint, the obtaining a difference comprising obtaining a frequency range of the first audio signal;
second determining logic executed by the processor for determining, using the ambient sound signal, an emotion of the user for a segment of the media program; and
aggregating logic executed by the processor for aggregating the emotion of each user to determine a representative emotion of the plurality of users for the segment of the media program.

15. The computing device of claim 14, wherein the second determining logic for the determining of the emotion of the user further comprises logic to determine an amplitude of the ambient sound signal.

16. The computing device of claim 14, wherein the second determining logic for the determining of the emotion of the user further comprises performing logic executed by the processor for performing a spectrum analysis of the ambient sound signal to classify the ambient sound signal.

17. The computing device of claim 14, wherein the aggregating logic for aggregating the emotion of each user to determine a representative emotion of the plurality of users further comprises comparing logic executed by the processor for comparing the ambient sound signal of the user with a plurality of other ambient sound signals associated with other users in different locations.

18. The computing device of claim 14, wherein the second determining logic for determining the emotion of the user further comprises determining logic executed by the processor for determining, from the ambient sound signal, an emotion selected from a group of emotions consisting of laughing, crying, cheering, screaming, clapping, booing, stomping, singing, and sound made by an instrument.

19. The computing device of claim 14, wherein the receiving logic for receiving the first audio signal fingerprint comprising ambient sound associated with the user further comprises logic for receiving the first audio signal fingerprint comprising ambient sound associated with the user and with other people in an area associated with the user.

20. The computing device of claim 14, further comprising transmitting logic executed by the processor for transmitting the determined emotion of the user to the client device.

21. The computing device of claim 20, wherein the transmitting logic for transmitting the determined emotion further comprises logic for transmitting an advertisement to the client device.

22. The computing device of claim 14, further comprising updating logic executed by the processor for updating a status on a social networking site based on the emotion.

23. The computing device of claim 14, wherein the aggregating logic for aggregating the emotion of each user to determine a representative emotion of the plurality of users further comprises identifying logic executed by the processor for identifying that the segment of the media program should be a highlight of the media program.

24. The computing device of claim 14, further comprising transmitting logic executed by the processor for transmitting a recommendation that the media segment should be a highlight of the media program to a third party associated with the media program.

25. The computing device of claim 14, wherein the aggregating logic for aggregating further comprises identifying logic executed by the processor for identifying a team that the user is cheering for in the media program.

26. The computing device of claim 14, wherein the aggregating logic to aggregate further comprises providing logic executed by the processor for providing show synopsis of the media program based on the representative emotion of the plurality of users.

27. A non-transitory computer readable storage medium tangibly storing computer program instructions capable of being executed by a computer processor, the computer program instructions defining the steps of:

storing, by the computer processor, a plurality of reference audio signal fingerprints, each reference audio signal fingerprint associated with a reference audio signal of a media program;

for each user in a plurality of users, receiving, by the computer processor, a first audio signal fingerprint from a client device operated by a user, the first audio signal fingerprint associated with a first audio signal comprising ambient sound associated with the user and an audio signal of the media program;

searching, by the computer processor, the stored plurality of reference audio signal fingerprints to determine one of the stored plurality of reference audio signal fingerprints that matches the first audio signal fingerprint above a given threshold;

extracting, by the computer processor, an ambient sound signal comprising the ambient sound from the first audio signal fingerprint by obtaining a difference between the one of the stored plurality of reference audio signal fingerprints and the first audio signal fingerprint, the obtaining a difference comprising obtaining a frequency range of the first audio signal;

determining, by the computer processor, using the ambient sound signal, an emotion of the user for a segment of the media program; and aggregating, by the computer processor, the emotion of each user to determine a representative emotion of the plurality of users for the segment of the media program.

* * * * *